United States Patent
Yang et al.

(10) Patent No.: US 7,837,102 B2
(45) Date of Patent: Nov. 23, 2010

(54) METHOD AND APPARATUS FOR COMPUTER LOGIN SECURITY USING RFID TECHNOLOGY

(75) Inventors: Chao-Tung Yang, Tai-Nan (TW); Shou-Fang Chen, Hsin-Chu Hsien (TW)

(73) Assignee: MStar Semiconductor, Inc., ChuPei, Hsin-Chu Hsien (TW)

( * ) Notice: Subject to any disclaimer, the term of this patent is extended or adjusted under 35 U.S.C. 154(b) by 1022 days.

(21) Appl. No.: 11/424,234

(22) Filed: Jun. 15, 2006

(65) Prior Publication Data

US 2007/0290036 A1 Dec. 20, 2007

(51) Int. Cl.
*G06K 19/06* (2006.01)
*G06K 5/00* (2006.01)
*G06K 7/08* (2006.01)

(52) U.S. Cl. .................. 235/382; 235/375; 235/380; 235/382.5; 235/451; 235/492; 340/572.1; 340/572.2

(58) Field of Classification Search ............... 235/375, 235/380, 451, 492; 340/572.1, 572.2
See application file for complete search history.

(56) References Cited

U.S. PATENT DOCUMENTS

| | | | |
|---|---|---|---|
| 6,418,533 B2 * | 7/2002 | Angelo et al. | ................ 726/19 |
| 6,647,497 B1 | 11/2003 | Cromer | |
| 6,823,459 B1 * | 11/2004 | Horikoshi et al. | ............. 726/17 |
| 7,184,752 B2 | 2/2007 | Chen | |
| 7,230,520 B2 | 6/2007 | Zaretsky | |
| 2004/0118916 A1 * | 6/2004 | He | .............................. 235/383 |
| 2004/0189635 A1 * | 9/2004 | Hoisko | ........................ 345/424 |
| 2005/0193182 A1 | 9/2005 | Anderson | |
| 2005/0242925 A1 * | 11/2005 | Zaretsky et al. | ............. 340/10.1 |
| 2006/0125606 A1 * | 6/2006 | Chen et al. | ................ 340/10.51 |
| 2006/0208853 A1 * | 9/2006 | Kung et al. | ................. 340/5.61 |
| 2006/0255131 A1 * | 11/2006 | Stewart | ....................... 235/383 |
| 2007/0150331 A1 * | 6/2007 | Perri et al. | ..................... 705/10 |
| 2009/0254199 A1 * | 10/2009 | Vrba et al. | ...................... 700/7 |

* cited by examiner

*Primary Examiner*—Thien M. Le
*Assistant Examiner*—Tuyen K Vo
(74) *Attorney, Agent, or Firm*—Winston Hsu; Scott Margo

(57) ABSTRACT

A method and an apparatus utilizing the RFID technology for the login security of a computing device are disclosed. The computing device includes a processing unit, an RFID reader, and a memory. The RFID reader is coupled to the processing unit for communicating with an external RFID tag in which a user data is stored. The memory is coupled to the processing unit for storing a login data. The RFID reader reads the user data from the RFID tag and the processing unit compares the user data with the login data. If the user data matches the login data, the processing unit allows the computing device to be accessed.

7 Claims, 5 Drawing Sheets

METHOD AND APPARATUS FOR COMPUTER LOGIN SECURITY USING RFID TECHNOLOGY

BACKGROUND OF INVENTION

1. Field of the Invention

The present invention relates to a method and an apparatus for setting up a secure login procedure on a computing device, especially to a method and an apparatus using the RFID technology to login a computing device.

2. Description of the Prior Art

When a user is about to use a computer, the operating system usually requires the user to provide login information. The login information usually includes a user name and a password. If the user name and the password are checked correct, the user can be allowed to access the computer. Sometimes, when a computer powers on, the computer also checks password when executing the POST (power on self test). If the entered password does not match the predetermined password, the computer does not boot up and hence the user cannot access the computer.

In addition to a password, some computers utilize fingerprint to identify an authorized user. The fingerprint reader may be embedded in a computer or as an external device connected to the computer through any kind of interface such as a USB interface. If the fingerprint reader recognizes a correct fingerprint, the computer is ready to be accessed.

By using the above two methods personal privacy and important data can be securely protected. However, the password is easily forgotten and the fingerprint has a risk of fail recognition.

SUMMARY OF INVENTION

It is therefore a primary objective of the claimed invention to provide a method and an apparatus which utilize the RFID technology for computer login security.

According to an embodiment of the claimed invention, a computing device capable of being activated via an RFID (radio frequency identification) interface is disclosed. The computing device includes a processing unit, an RFID reader, and a memory. The RFID reader is coupled to the processing unit for communicating with an external RFID tag in which a user data is stored. The memory is coupled to the processing unit for storing a login data. The RFID reader reads the user data from the external RFID tag and the processing unit compares the user data with the login data. If the user data matches the login data, the processing unit allows the computing device to be accessed.

According to another embodiment of the claimed invention, a computing device capable of being activated via an RFID interface is disclosed. The computing device includes a processing unit, a memory, an interface, and a bus controller. The memory is coupled to the processing unit for storing a login data. The interface is utilized for connecting an external RFID reader. The bus controller is coupled between the processing unit and the interface for communicating with the external RFID reader. The RFID reader reads a user data from an external RFID tag and the user data is transmitted to the processing unit through the interface under the control of the bus controller. The processing unit compares the user data with the login data and if the user data matches the login data, the processing unit allows the computing device to be accessed.

According to still another embodiment of the claimed invention, a method of activating a computing device via an RFID interface is disclosed. The method includes: using an RFID reader to read a user data, which is stored in an RFID tag, into the computing device; comparing the user data with a login data, which is initially stored in the computing device; and if the user data matches the login data, allowing the computing device to be accessed.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
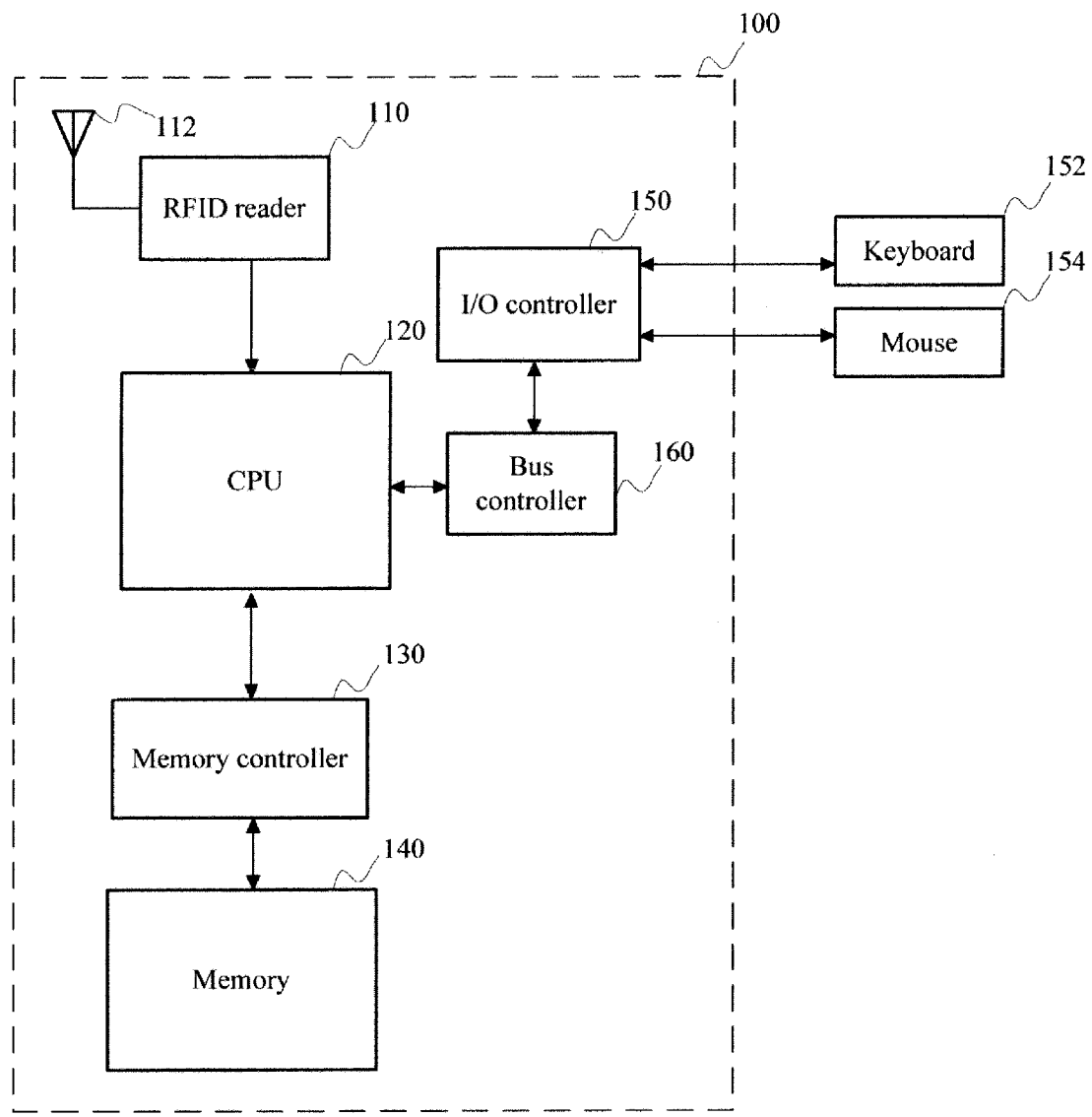
FIG. 1 shows an illustrative drawing of a computing device according to a first embodiment of the present invention.

Please refer to FIG. 1. FIG. 1 shows an illustrative drawing of a computing device according to a first embodiment of the present invention. The computing device 100 includes an RFID reader 110, a CPU 120, a memory controller 130, a memory 140, an I/O controller 150, and a bus controller 160. The RFID reader 110 is directly connected to the CPU 120 and the operating frequency of the RFID reader 110 is preferably 13.56 MHz, 125 KHz, 433.92 MHz or 900 MHz etc. The RFID reader 110 can communicate with an external RFID tag (not shown) through the antenna 112. An RFID tag is generally referred to as a transponder, which is made of a semiconductor device and transmits RF signals in response to reception of an RF signal from the RFID reader 110. The data received by the RFID reader 110 can be directly transmitted to the CPU 120. The memory 140 is coupled to the CPU 120 through the memory controller 130. The memory 140 stores several sets of login data. Each set of login data includes a user name and a password. Different users can be set to have different limits of authority. The memory controller 130 controls read and write process of the memory 140. When the CPU 120 requires data in the memory 140, the CPU 120 sends a command signal to the memory controller 130. After retrieving data from the memory 140, the memory controller 130 sends the data to the CPU 120. The CPU 120 is also coupled to an I/O controller 150 through the bus controller 160. The I/O controller 150 communicates with peripherals outside the computing device 100 such as a keyboard 152 and a mouse 154. Signals generated by the keyboard 152 or the mouse 154 are received by the I/O controller 150 and are further transmitted to the CPU under the control of the bus controller 160.

Figure 2:
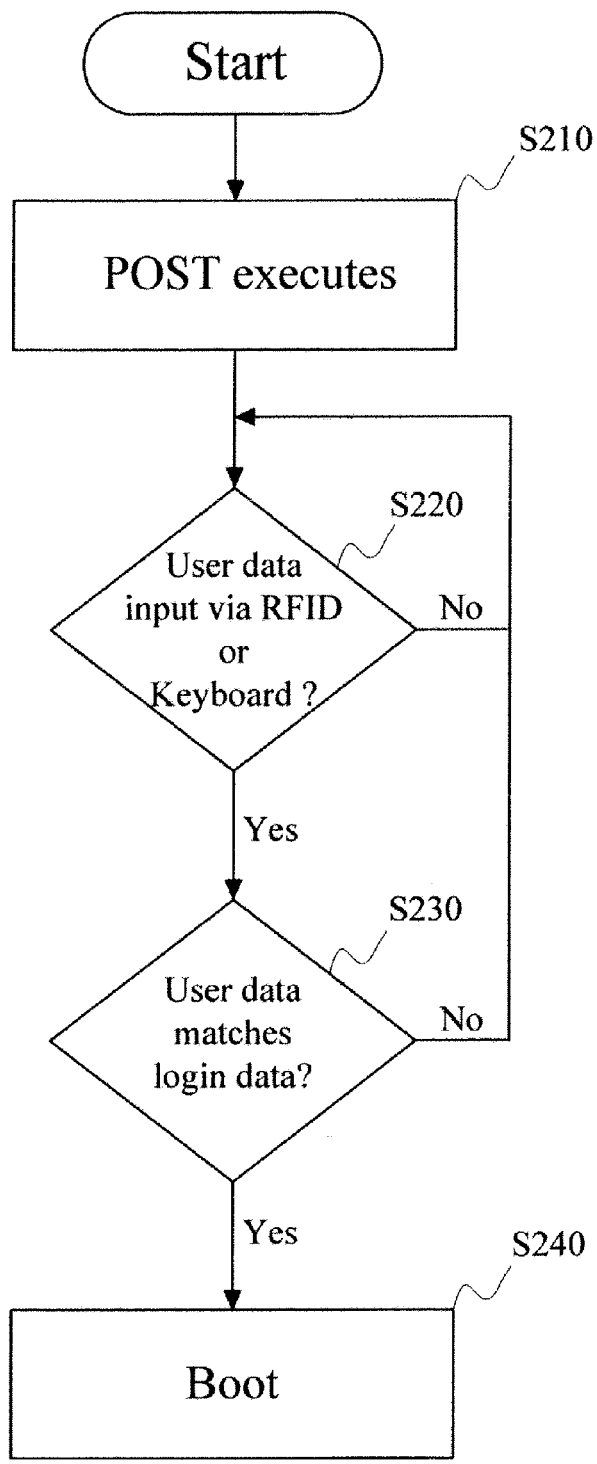
FIG. 2 shows a flow chart illustrating utilization of RFID technology in a computing device according to a first embodiment of the present invention.

Please refer to FIG. 2. FIG. 2 shows a flow chart illustrating utilization of RFID technology in a computing device according to a first embodiment of the present invention. First, the computing device 100 is powered on, and a POST (power on self test) of the computing device 100 executes (S210). Then the computing device 100 pauses to wait for a user data being input to the computing device 100 (S220). A user data usually includes a user name and a password. As mentioned above, the keyboard 152 is connected to the computing device 100 such that the user data can be input to the computing device 100 through the keyboard 152. In addition, since the computing device 100 is embedded with the RFID reader 110, a user data can also be input to the computing device 100 by using an RFID tag, in which a user data is stored, to communicate with the RFID reader 110. The computing device 100 keeps waiting until a user data is received via either the keyboard 152 or the RFID reader 110 (S220). When the computing device 100 receives the user data, the CPU 120 compares the user data with the login data stored in the memory 140 (S230). If the inputted user data does not match the login data, the computing device 100 goes back to step S220; however, if the user data matches the login data, the computing device 100 starts to boot (S240). In short, a computing device can be securely protected by using the RFID technology.

Figure 3:
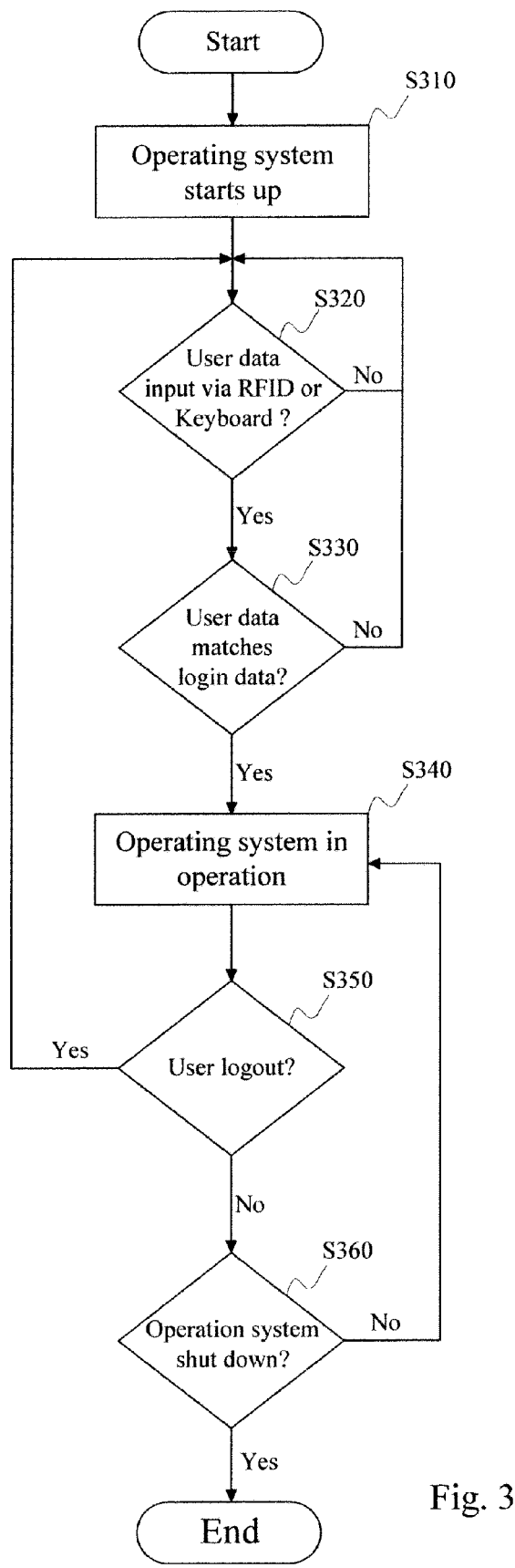
FIG. 3 shows a flow chart illustrating utilization of RFID technology in a computing device according to a second embodiment of the present invention.

Please refer to FIG. 3. FIG. 3 shows a flow chart illustrating utilization of RFID technology in a computing device according to a second embodiment of the present invention. After the computing device 100 finishes the POST, it begins to execute an operating system (S310). Generally, the operating system requires a user data to prepare different environment settings for different user, and also different limits of authority can be set according to the user. Therefore, the operating system keeps waiting for a user data to be input to the computing device 100 until a user data is input via either the keyboard 152 or the RFID reader 110 (S320). When a user data is input, the CPU 120 compares the user data with the login data stored in the memory 140 (S330). If the inputted user data does not match the login data, the computing device 100 goes back to step S320; however, if the user data matches the login data, the computing device 100 will be running the operating system (S340). Afterwards, the computing device 100 checks if the user logouts the operating system (S350). If the user logouts the operating system, the computing device goes back to step S320, waiting for a user data; if the user does not logout the operating system, the computing device 100 checks if the operating system is shut down (S360). If the operating system is not shut down, the computing device 100 goes back to step S340; if the operating system is shut down, the operating system is quit. Next time after the operating system starts up (S310) and before the operating system in operation (S340), the computing device 100 still requires a correct user data. Similarly, a computer can be securely protected by using the RFID technology.

Figure 4:
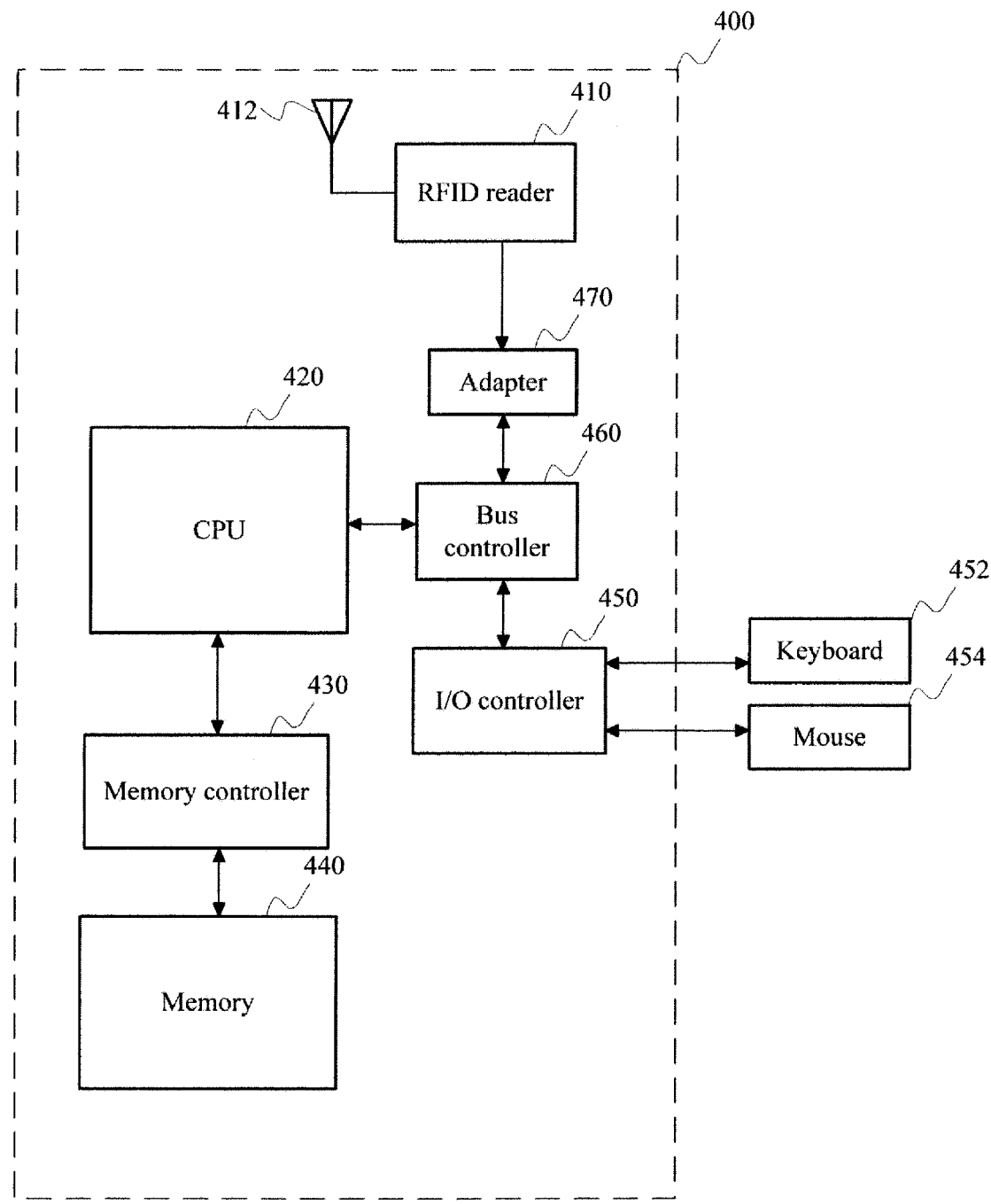
FIG. 4 shows an illustrative drawing of a computing device according to a second embodiment of the present invention.

In addition to the computer 100 shown in FIG. 1, there are also different kinds of configurations of computing devices that utilize RFID technology for security. Please refer to FIG. 4. FIG. 4 shows an illustrative drawing of a computing device according to a second embodiment of the present invention. The computing device 400 includes an RFID reader 410, a CPU 420, a memory controller 430, a memory 440, an I/O controller 450, a bus controller 460 and an adapter 470. The CPU 420, the memory controller 430, the memory 440, the I/O controller 450, and the keyboard 452 and the mouse 454, which are connected to the I/O controller 450, have the same function as their corresponding devices shown in FIG. 1. For brevity, the description of these devices is omitted. In this embodiment, the RFID reader 410 which has an antenna 412 is coupled to the bus controller 460 through an adapter 470. Preferably, the operating frequency of the RFID reader 410 is 13.56 MHz, 125 KHz, 433.92 MHz or 900 MHz etc. The RFID reader 410 reads a user data and then the user data is transmitted to the CPU 420 through the adapter 470 under the control of the bus controller 460. The CPU 420 then compares the user data with the login data stored in the memory 440. The adapter 470 can be implemented by an internal connection interface such as a PCI (Peripheral Component Interconnect), a mini PCI, PCMCIA (Personal Computer Memory Card International Association), CompactFlash, SDIO etc.

Figure 5:
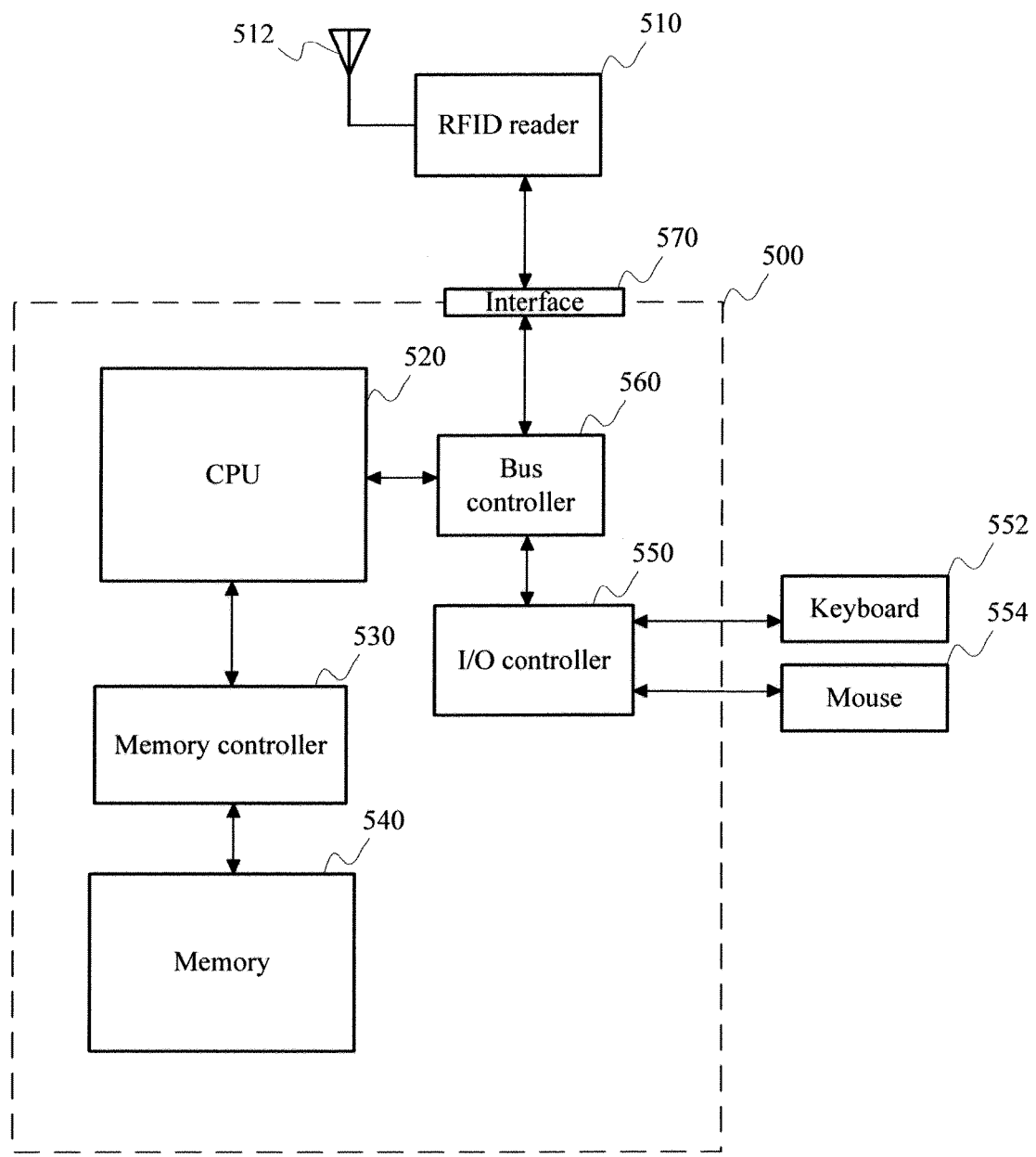
FIG. 5 shows an illustrative drawing of a computing device according to a third embodiment of the present invention.

Please refer to FIG. 5. FIG. 5 shows an illustrative drawing of a computing device according to a third embodiment of the present invention. The computing device 500 includes a CPU 520, a memory controller 530, a memory 540, an I/O controller 550, a bus controller 560, and an interface 570. The CPU 520, the memory controller 530, the memory 540, the I/O controller 550, and the keyboard 552 and the mouse 554, which are connected to the I/O controller 550, have the same function as their corresponding devices shown in FIG. 1. For brevity, the description of these devices is omitted. In this embodiment, an RFID reader 510 which has an antenna 512 is coupled to the computing device 500 through the interface 570. Preferably, the operating frequency of the RFID reader 410 is 13.56 MHz, 125 KHz, 433.92 MHz or 900 MHz etc. The RFID reader 510 reads user data and then the user data is transmitted to the CPU 520 through the interface 570 under the control of the bus controller 560. The CPU 520 then compares the user data with the login data stored in the memory 540. The interface 570 can be implemented by a USB (Universal Serial Bus) interface, an IEEE 1394 (firewire) interface, an RS232 interface, etc.

In summary, a computing device such as a desktop computer, a laptop computer or even a PDA can use the RFID technology as a login means for a user to login the computing device. Using RFID to login the computing device can avoid having the risk of forgetting password or fail recognition of a fingerprint. The RFID reader can be embedded in the computing device by being directly coupled to the CPU or through an adapter such as a PCI (Peripheral Component Interconnect), a mini PCI, PCMCIA, CompactFlash, SDIO etc. Alternatively, the RFID reader can be an external device to the computing device as well. The RFID reader can be connected to the computing device through an interface such as a USB interface, an IEEE 1394 interface or an RS232 interface. The RFID added computing device checks user data when the CPU is executing a POST (power on self test) of the computing device or when the CPU is executing an operating system of the computing device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A computing device selectively activated via an RFID (radio frequency identification) interface, comprising:
   a processing unit;
   a bus controller coupled to the processing unit;

an RFID reader for communicating with an external RFID tag in which a user data is stored;

an adapter coupled between the RFID reader and the bus controller; and a memory coupled to the processing unit for storing a login data;

wherein during the processing unit executing an operating system of the computing device, the bus controller controls the adapter to receive the user data from the RFID reader and transmits the user data to the processing unit, wherein before the processing unit compares the user data with the login data, the processing unit has performed a logout process; and if the user data matches the login data, the processing unit performs a login process and allows the computing device to be accessed.

2. The computing device of claim 1, wherein the operating frequency of the RFID reader is selected from a group consisting of 13.56 MHz, 125 KHz, 433.92 MHz and 900 MHz.

3. The computing device of claim 1 further comprising an input/output controller coupled to the processing unit for controlling a keyboard, through which the user data can be input to the computing device, wherein the processing unit compares the user data with the login data and if the user data matches the login data, the processing unit allows the computing device to be accessed.

4. The computing device of claim 1, wherein the adapter is selected from a group consisting of PCI, mini PCI, PCMCIA (Personal Computer Memory Card International Association), CompactFlash and SDIO.

5. A method of activating a computing device via an RFID interface, comprising:

using an RFID reader to communicate with an RFID tag to read a user data and transmitting the user data to a processing unit of the computing device, the user data being stored in an RFID tag;

comparing the user data with a login data by the processing unit, the login data being stored in the computing device; and during the processing unit executing an operating system of the computing device, the processing unit having performed a logout process before the processing unit compares the user data with the login data, and if the user data matches the login data, the processing unit performing a login process and allowing the computing device to be accessed.

6. The method of claim 5, wherein the operating frequency of the RFID reader is selected from a group consisting of 13.56 MHz, 125 KHz, 433.92 MHz and 900 MHz.

7. The method of claim 5 further comprising inputting the user data to the computing device via a keyboard.

* * * * *